(12) United States Patent
Liao et al.

(10) Patent No.: US 11,172,177 B2
(45) Date of Patent: Nov. 9, 2021

(54) PROJECTION SYSTEM

(71) Applicants: BenQ Intelligent Technology (Shanghai) Co., Ltd, Shanghai (CN); BENQ CORPORATION, Taipei (TW)

(72) Inventors: Yuan-Chen Liao, Taipei (TW); Chen-Cheng Huang, Taoyuan (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/064,696

(22) Filed: Oct. 7, 2020

(65) Prior Publication Data

US 2021/0112225 A1 Apr. 15, 2021

(30) Foreign Application Priority Data

Oct. 14, 2019 (CN) .......................... 201910971955.4

(51) Int. Cl.
*H04N 9/31* (2006.01)

(52) U.S. Cl.
CPC ........... *H04N 9/3158* (2013.01); *H04N 9/317* (2013.01); *H04N 9/3108* (2013.01)

(58) Field of Classification Search
CPC .. H04N 9/3161; H04N 9/3158; H04N 9/3108; H04N 9/317; H04N 9/31; H04N 9/3138; H04N 9/3164; H04N 9/3167
USPC ....... 348/744, 759–761, 764, 766, 770, 771; 353/30, 31, 33, 37, 81, 97, 98, 102
See application file for complete search history.

(56) References Cited

U.S. PATENT DOCUMENTS

| 8,690,343 B2* | 4/2014 | Tanaka | G03B 21/2013 |
| | | | 353/31 |
| 2013/0242272 A1* | 9/2013 | Baba | H04N 9/3152 |
| | | | 353/81 |

FOREIGN PATENT DOCUMENTS

| CN | 104617197 A | 5/2015 |
| CN | 109212878 A | 1/2019 |
| TW | 201833653 A | 9/2018 |
| TW | 201907221 A | 2/2019 |

OTHER PUBLICATIONS

Office action of counterpart application by Taiwan IP Office dated Aug. 19, 2020.
Office action of counterpart application by SIPO dated Jul. 12, 2021.

* cited by examiner

*Primary Examiner* — Sherrie Hsia

(57) ABSTRACT

A projection system including at least a light source, at least a dichroic filter element and a light-adjusting diaphragm element is provided. The light source is configured to emit a first color light having a spectrum of a first wavelength range and a second color light having a spectrum of a second wavelength range. The dichroic filter element is configured to reflect or allow the first color light and the second color light to pass through. The light-adjusting diaphragm element has a filter and is located on an optical path generated after the first color light and the second color light are split. The first color light passes through the filter, which blocks at least a part of the energy of the second color light, such that a transmittance of the spectrum of the first wavelength range is greater than that of the spectrum of the second wavelength range.

20 Claims, 5 Drawing Sheets

PROJECTION SYSTEM

This application claims the benefit of People's Republic of China application Serial No. 201910971955.4, filed Oct. 14, 2019, the subject matter of which is incorporated herein by reference.

BACKGROUND OF THE INVENTION

Field of the Invention

The invention relates in general to a projection system, and more particularly to a projection system having a light-adjusting diaphragm element.

Description of the Related Art

In response to the current trend of lightweight, slimness and compactness, conventional projectors are directed towards miniaturization and high color performance. Micro-projectors having great portability can be manufactured as portable micro-projectors, and can further be used in various electronic products. For example, micro-projectors can be built in electronic products, such as mobile phones, multi-media layers or notebook computers, to expand their functional diversity.

Optical elements, such as diaphragm and lens, can be used in a projection system to adjust the light of the light-emitting element. The diaphragm, for example, can be a digital micro-mirror device (DMD) or a liquid crystal switch element. To achieve a high optical performance in brightness, most of the current micro-projectors use the light-emitting diodes of the three primary colors, namely, red, green and blue, as the light source, and directly project the tri-color lights to the digital micro-mirror device to form an image.

In terms of contrast detection, human eyes are most sensitive to the green light. The green pattern looks brighter and provides a better contrast effect. However, during contrast detection, if the brightness of a stray light is too high, the stray light will affect the overall contrast of the output image, making it difficult to improve the image quality of the projection system. Meanwhile, since the color gamut of the image becomes smaller, the requirement of wide color gamut according to the DCI-P3 color gamut standards cannot be met.

SUMMARY OF THE INVENTION

The invention is directed to a projection system capable of reducing the dark field brightness of the image to increase the image contrast without affecting the color performance of the image.

According to one embodiment of the present invention, a projection system is provided. The projection system includes at least a light source, at least a dichroic filter element and a light-adjusting diaphragm element. The light source is configured to emit a first color light having a spectrum of a first wavelength range and a second color light having a spectrum of a second wavelength range. The dichroic filter element is configured to reflect or allow the first color light and the second color light to pass through. The light-adjusting diaphragm element has a filter and is located on an optical path generated after the first color light and the second color light are combined, wherein the first color light passes through the filter, which blocks at least a part of the energy of the second color light, such that a transmittance of the spectrum of the first wavelength range is greater than a transmittance of the spectrum of the second wavelength range.

According to another embodiment of the present invention, a projection system is provided. The projection system includes a first light source, a second light source, a light-combining prism element and a light-adjusting diaphragm element. The first light source is configured to emit a first color light having a spectrum of a first wavelength range; the second light source is configured to emit a second color light having a spectrum of a second wavelength range. The light-combining prism element is located on an optical path of the first light source and the second light source to combine the first color light and the second color light. The light-adjusting diaphragm element is interposed between the second light source and the light-combining prism element and has a filter, which blocks at least a part of the energy of the second color light, such that a transmittance of the spectrum of the second wavelength range is less than a set value.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, a projection system configured to project an image light on a screen is provided. Generally speaking, contrast refers to a ratio of the brightness of a white projection image to the brightness of a black projection image projected or a ratio of the brightness of a white block in a black and white interval image to the brightness of a black block in the black and white interval image. To increase the image contrast, a light-adjusting diaphragm element 140 (refer to FIGS. 2A and 2B) can be located on the optical path generated after the lights are combined or split to reduce the amount of the light entering the projection system 100 and make the dark field of the projection image becomes darker, such that the contrast and graduation of the image can be increased.

Figure 1A:
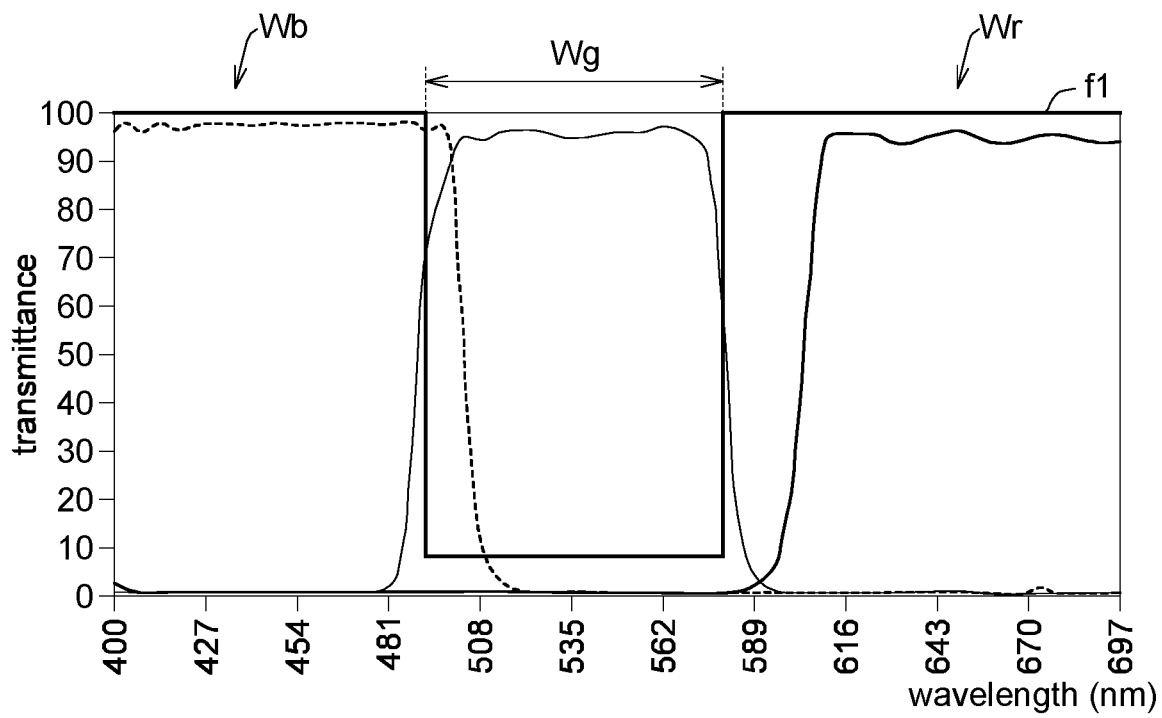
FIGS. 1A and 1B respectively are schematic diagrams of a transmittance of the spectrum of each color light.
Figure 1B:
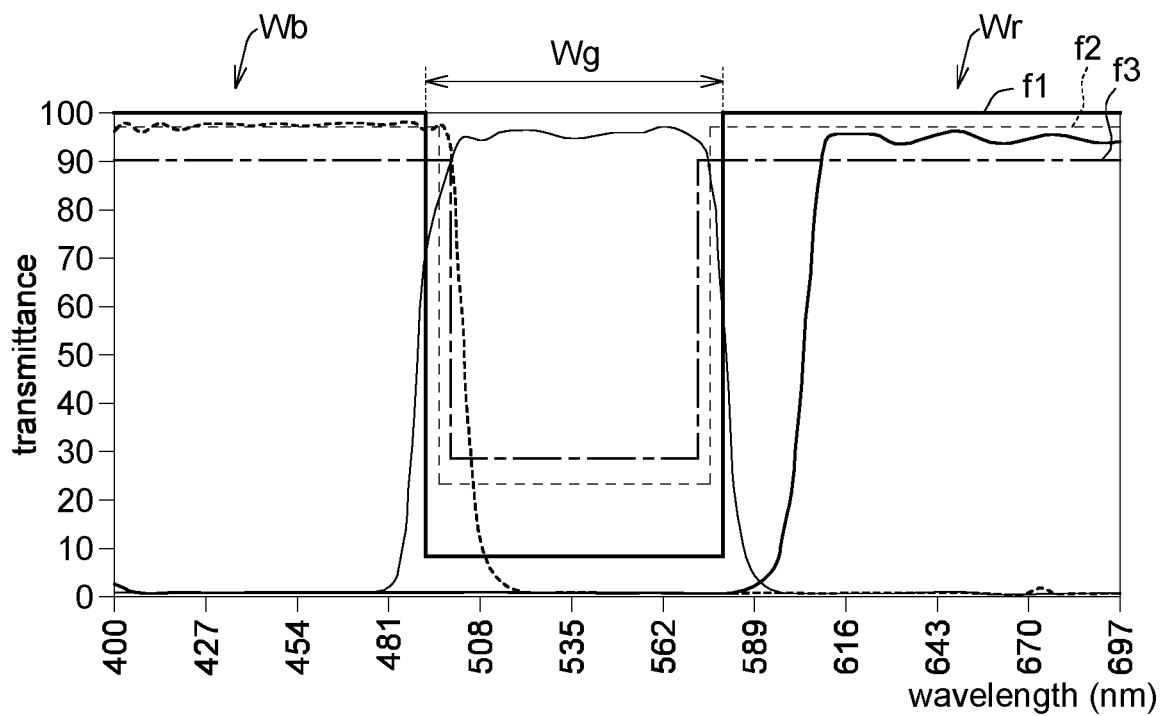

Referring to FIGS. 1A and 1B, schematic diagrams of a transmittance of the spectrum of each color light are respectively shown. The light source is configured to emit a first color light having spectrum Wr or Wb of a first wavelength range and a second color light having a spectrum Wg of a second wavelength range. In an embodiment, the first color light having the spectrum Wr or Wb can pass through the light filtering material f1, but at least a part of the energy of the second color light is blocked by the light filtering material f1, such that the transmittance of the spectrum Wr or Wb of the first wavelength range is greater than the transmittance of the spectrum Wg of the second wavelength range.

In an embodiment, the spectrums Wr and Wb of the first wavelength range refer to the blue light spectrum and the red light spectrum, and the spectrum Wg of the second wavelength range refers to the green light spectrum or the yellow light spectrum (495-570 nm or 570-590 nm). The blue light spectrum and the red light spectrum of the first wavelength range can pass through the filter 143 of the light-adjusting diaphragm element 140; the energy of the yellow light spectrum or the green light spectrum of the second wavelength range can be blocked by the filter 143 and become eliminated. Since the blue light spectrum and the red light spectrum will not be blocked by the filter 143, the output energy of the blue light spectrum and the red light spectrum will not decrease. The projection system 100 of the present invention can eliminate the energy of other light spectrum, therefore it is not limited to eliminate the energy of the green light spectrum and the yellow light spectrum.

Figure 2A:
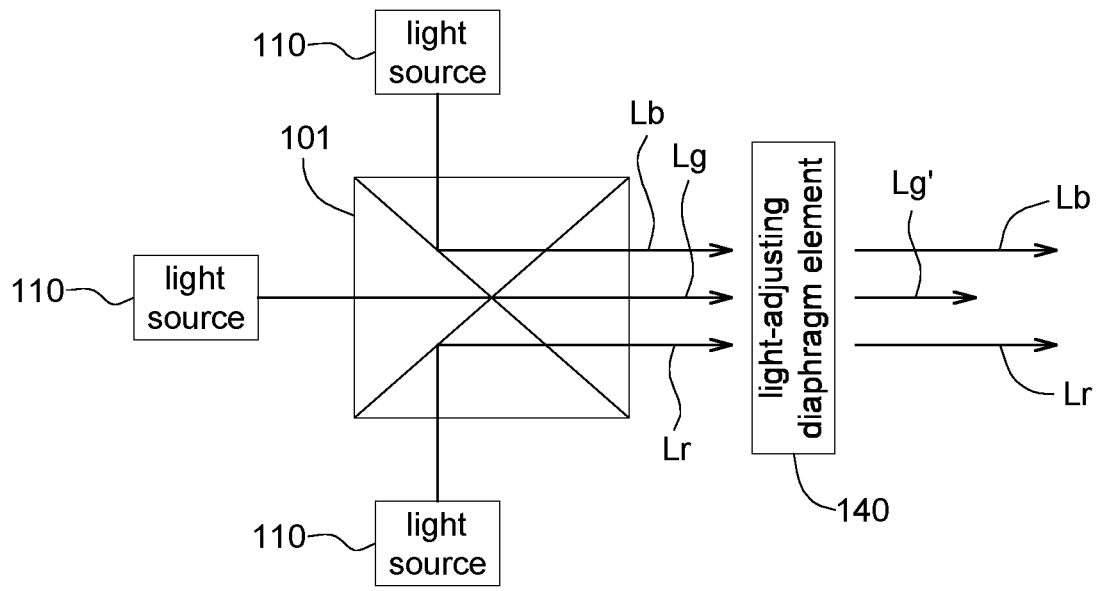
FIG. 2A is a schematic diagram of a projection system having a light-combining prism element according to an embodiment of the present invention.

Refer to FIG. 2A. In an embodiment, the projection system 100 includes a plurality of light sources 110, a light-combining prism element 101 and a light-adjusting diaphragm element 140. The light source 110, for example, can be a light-emitting element, such as light-emitting diode, laser diode, metal halogen bulb, UHE bulb or UHP bulb, and can be used to emit the color lights of distinct wavelength ranges for illumination or optical projection. The light-combining prism element 101 has a semi-reflective/semi-penetration coating film configured to reflect or allow the color lights of distinct wavelength ranges to pass through. For example, the blue light Lb and the red light Lr both correspond to the first wavelength range, and can be reflected to the light-adjusting diaphragm element 140 by the light-combining prism element 101; the green light Lg or the yellow light corresponds to the second wavelength range, and can pass through the light-combining prism element 101 to reach the light-adjusting diaphragm element 140. Additionally, the light-adjusting diaphragm element 140 is located on the optical path generated after the blue light, the red light and the green light (that is, the first color light and the second color light) are combined to adjust the output energy of the green light or the yellow light (represented by Lg'). In another embodiment, the light-adjusting diaphragm element 140 can be interposed between the light source 110 emitting the green light and the light-combining prism element 101 to adjust the output energy of the green light, such that the transmittance of the green light spectrum Wg (the spectrum corresponding to the second wavelength range) is less than a set value.

Figure 2B:
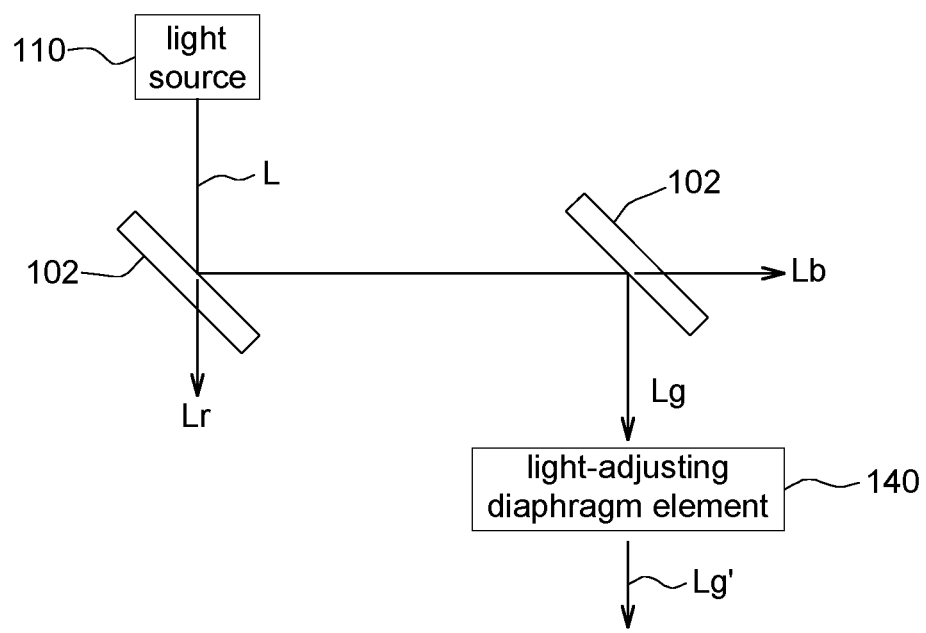
FIG. 2B is a schematic diagram of a projection system having a dichroic filter element according to an embodiment of the present invention.

Refer to FIG. 2B. In an embodiment, the projection system 100 includes a light source 110, at least a dichroic filter element 102 and a light-adjusting diaphragm element 140. The light source 110 is configured to emit a white light. The dichroic filter element 102 is configured to divide the white light into multiple color lights Lr, Lb, and Lg. The dichroic filter element 102 has a multi-color coating film configured to reflect or allow the color lights of distinct wavelength ranges to pass through. For example, the blue light Lb and the red light Lr corresponding to the first wavelength range can respectively pass through one of two dichroic filter elements 102; the green light Lg or the yellow light corresponding to the second wavelength range can sequentially be reflected to the light-adjusting diaphragm element 140 by the two dichroic filter elements 102. The light-adjusting diaphragm element 140 is located on the optical path generated after the blue light, the red light and the green light (that is, the first color light and the second color light) are split to adjust the output energy of the green light or the yellow light (Lg' represents the adjusted Lg).

Figure 3A:
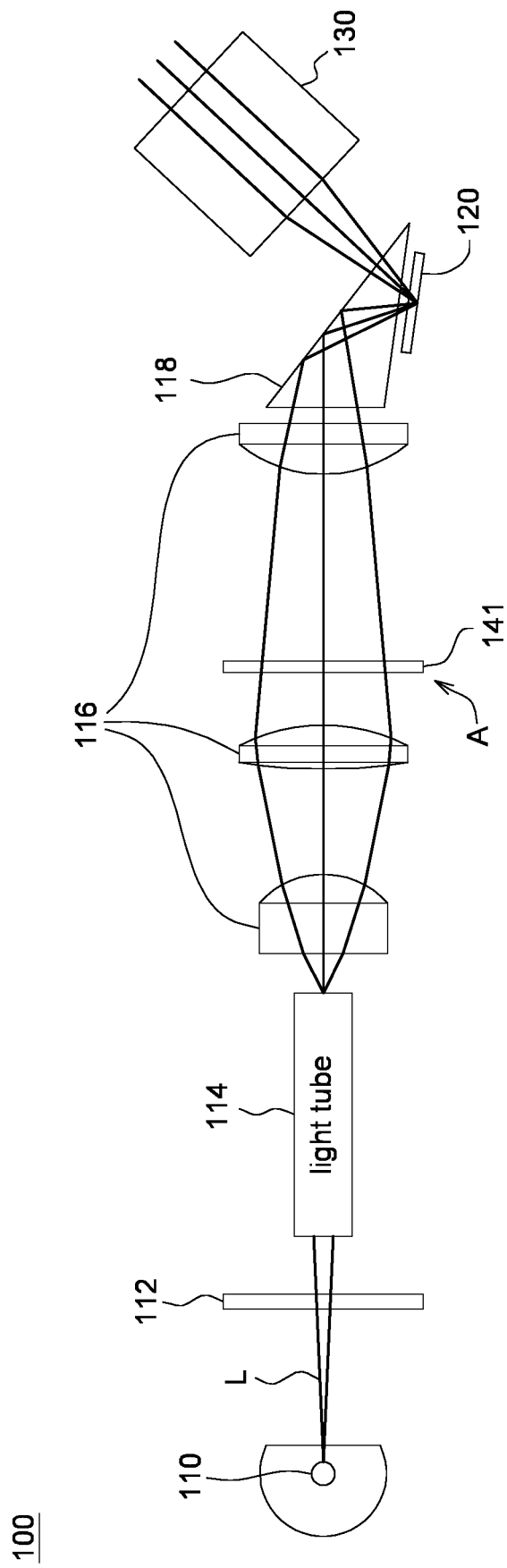
FIGS. 3A and 3B are schematic diagrams of a projection system according to two embodiments of the present invention.
Figure 3B:
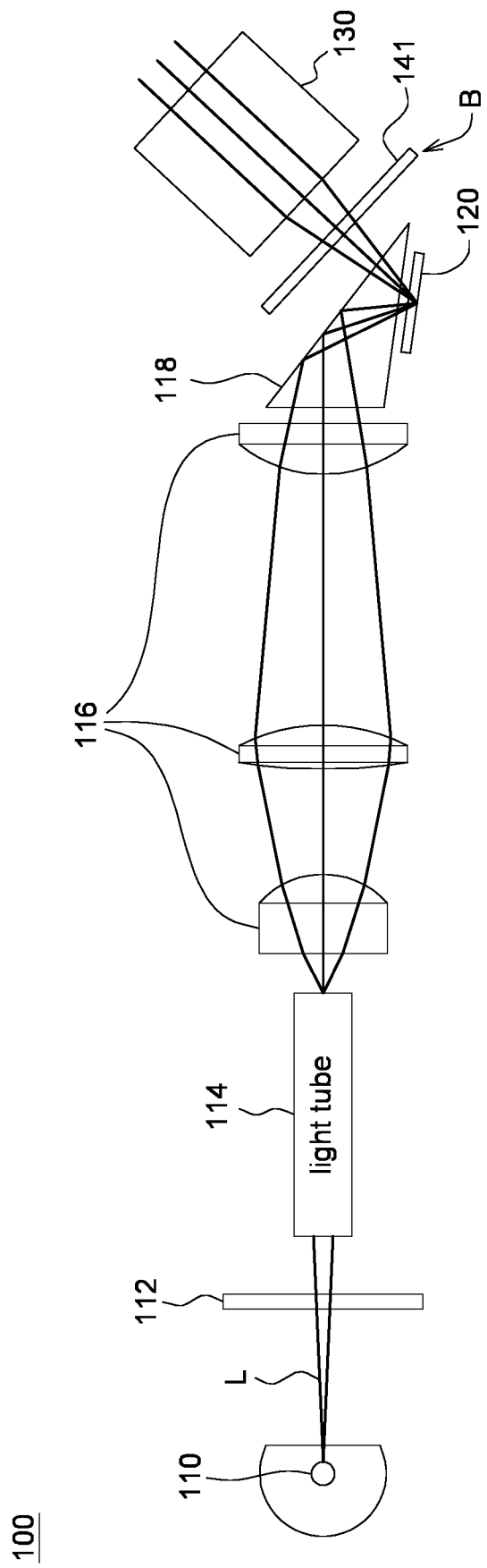

Also, the color lights emitted by the light source 110 can be adjusted by an optical element indicated in FIGS. 3A and 3B, such as a color wheel, a light tube, a set of lens, a total internal reflection (TIR) prism, a lens having diopter (such as field lens) or a diaphragm, and the detail of description are not repeated here.

The diaphragm can be a digital micro-mirror device (DMD), a liquid crystal switch element or any electricity-driven element or device capable of converting the light emitted by the light-emitting element into an image light. The diaphragm is commonly used in the digital projection system.

The light-adjusting diaphragm element can be disposed behind the lens to limit the diameter of the light beam passing through the lens. Generally speaking, the diaphragm can eliminate the peripheral energy of the incident light to avoid the peripheral energy being too high and affecting the contrast. Refer to FIGS. 3A and 3B. The projection system 100 of the present invention can have a light-adjusting diaphragm element 141 disposed on a suitable optical path to purify the image light and increase the color performance of the image light.

The projection system 100 includes a light source 110, a filter device 112, a light tube 114, at least a condenser 116, a reflector 118, a digital micro-mirror device 120, a projection lens 130 and a light-adjusting diaphragm element 141. The light-adjusting diaphragm element 141 is interposed between the light source 110 and the projection lens 130. The light-adjusting diaphragm element 141 can be located at position A of FIG. 3A or position B of FIG. 3B. In an embodiment, the light tube 114 is interposed between the light source 110 and the projection lens 130 to limit the color light L travelling towards the projection lens 130 through the optical path. The condenser 116 is interposed between the light tube 114 and the digital micro-mirror device 120. The reflector 118 is interposed between the condenser 116 and the digital micro-mirror device 120 to reflect the color light L to the digital micro-mirror device 120.

The digital micro-mirror device 120, located on the optical path generated after all color lights L are combined, includes a plurality of micro-reflectors (not illustrated) whose angles are adjustable. The micro-reflector is configured to reflect the color light L to the projection lens 130 to become an image light, or adjust the angle of the micro-reflector to reflect the color light L to the dark state optical path instead of outputting the image light. The light-adjusting diaphragm element 141 is disposed on the diaphragm behind the light tube 114, that is, the diaphragm interposed between the light tube 114 and the projection lens 130. As indicated in FIG. 3A, the light-adjusting diaphragm element 141 is located on the position interposed between the light tube 114 and the reflector 118 or is located on the position interposed between two condensers 116. Or, as indicated in FIG. 3B, the light-adjusting diaphragm element 141 is located on the position interposed between the digital micro-mirror device 120 and the projection lens 130.

Figure 4A:
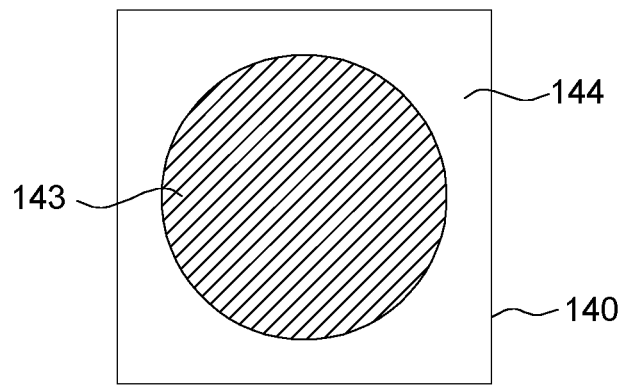
FIG. 4A is a schematic diagram of a light-adjusting diaphragm element of a projection system according to an embodiment of the present invention.

Refer to FIG. 4A, the light-adjusting diaphragm element 140 has a filter 143 whose periphery has an opaque light-shielding region 144. The light-adjusting diaphragm element 140 is formed of an entire filter element, and is shielded to form the light-shielding region 144. For example, the light-shielding region 144 is formed of an opaque material, such as black matt paint, by way of coating, evaporation or adhesion.

In an embodiment, the filter 143 can be formed of a light filtering material having distinct transmittances with respect to the green light or the yellow light. Refer to FIG. 1B. The first light filtering material f1 has a first transmittance with respect to the green light or the yellow light; the second light filtering material f2 has a second transmittance with respect to the green light or the yellow light; the third light filtering material f3 has a third transmittance with respect to the green light or the yellow light. The first transmittance is smaller than the second transmittance; the second transmittance is smaller than third transmittance. In the present embodiment, the light filtering materials f1, f2, and f3 having distinct transmittances can respectively be disposed on the filter 140, such that the transmittance of the spectrum Wg of the green light or the yellow light gradually decreases or increases outwards from the center of the filter 140. For example, the transmittance decreases to 70% from 100%, and then further decreases to 50%, 20% or 0% from 70%.

Figure 4B:
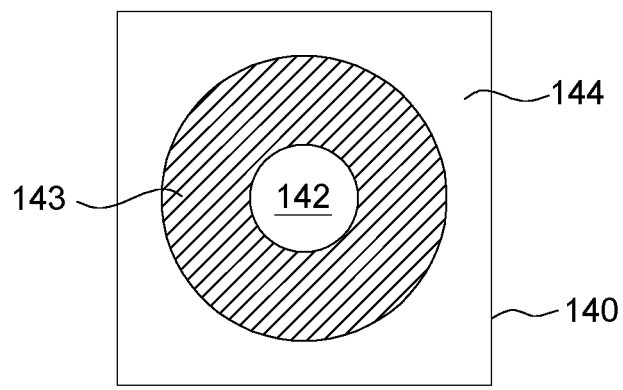
FIGS. 4B and 4C respectively are schematic diagrams of a light-adjusting diaphragm element of a projection system according to another embodiment of the present invention.

Refer to FIG. 4B. The center of the light-adjusting diaphragm element 140 has an opening 142. The opening 142 has a circular shape or other shape and allows all color lights to completely pass through, such that the output energy of the central region of the diaphragm can be increased. In an embodiment, the light-adjusting diaphragm element 140 is an opaque metal element, and a hole is formed on the opaque metal element by way of stamping. Then, the filter 143 is embedded into the hole. The center of the filter 143 forms an opening 142, which allows the color light to completely pass through. The opening 142 can be formed by hollowing the filter 143 or by using a transparent material.

Figure 4C:
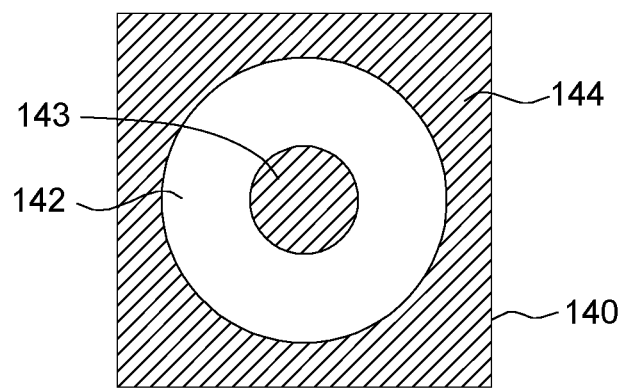

Refer to FIG. 4C. The filter 143 is located at the center of the light-adjusting diaphragm element 140. The periphery of the filter 143 has an opening 142 formed of a transparent material. The opening 142 has a circular shape, oval shape or other shape, and allows the color light surrounding the filter 143 to completely pass through, such that the output energy of the periphery of the diaphragm can be increased. The opening 142, which can be formed by hollowing the light-adjusting diaphragm element 140, connects the filter 143 and the opaque region 144 in a radial direction.

The function of the light-adjusting diaphragm element 140 is similar to the combination of a diaphragm and a filter. The first color light (the blue light spectrum Wb and the red light spectrums Wr corresponding to the first wavelength range) can pass through the filter 143 or the opening 142 of the light-adjusting diaphragm element 140, and at least a part of the energy of the second color light (the yellow light spectrum or the green light spectrum Wg corresponding to the second wavelength range) is blocked by the filter 143 or at least a part of the energy passes through the opening 142, such that a transmittance of the spectrum of the first wavelength range is greater than a transmittance of the spectrum of the second wavelength range. Thus, the projection system 100 disclosed in above embodiments of the present invention can reduce the dark field brightness to increase the image contrast without affecting the color performance of the image.

Meanwhile, during contrast detection, since the brightness of the stray light decrease, the overall contrast of the output image will relatively increase and the image quality of the projection system will improve. Meanwhile, since the color gamut of the image is purified by the light-adjusting diaphragm element, the requirement of wide color gamut according to the DCI-P3 color gamut standard can be met.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection system, comprising:
   at least a light source configured to emit a first color light having a spectrum of a first wavelength range and a second color light having a spectrum of a second wavelength range;
   at least a dichroic filter element configured to reflect or allow the first color light and the second color light to pass through; and
   a light-adjusting diaphragm element having a filter and located on an optical path generated after the first color light and the second color light are split by the dichroic filter element, wherein the first color light passes through the filter, and the filter blocks a part of the energy of the second color light, such that a transmittance of the spectrum of the first wavelength range is greater than a transmittance of the spectrum of the second wavelength range.

2. The projection system according to claim 1, wherein a center of the light-adjusting diaphragm element has an opening, and the filter is located on an outer edge of the opening.

3. The projection system according to claim 2, wherein the filter is hollowed to form the opening or the opening is formed of a transparent material.

4. The projection system according to claim 1, wherein the filter is located at a center of the light-adjusting diaphragm element, the light-adjusting diaphragm element has an opening located on an outer edge of the filter.

5. The projection system according to claim 4, wherein the filter is hollowed to form the opening or the opening is formed of a transparent material.

6. The projection system according to claim 1, wherein the light-adjusting diaphragm element is formed of an entire filter element, and the peripheral area of the filter is shielded to form a light-shielding region.

7. The projection system according to claim 1, wherein the transmittance of the spectrum of the second wavelength range diminishes outwards from a center of the filter.

8. The projection system according to claim 7, wherein the filter is formed of light filtering materials having distinct transmittances with respect to the second color light.

9. The projection system according to claim 1, further comprising a digital micro-mirror device located on an optical path generated after the first color light and the second color light are combined.

10. The projection system according to claim 9, further comprising at least a condenser and a reflector, the reflector is interposed between the condenser and the digital micro-mirror device to reflect the first color light and the second color light to a plurality of micro-reflectors of the digital micro-mirror device.

11. A projection system, comprising:
a first light source configured to emit a first color light having a spectrum of a first wavelength range;
a second light source configured to emit a second color light having a spectrum of a second wavelength range;
a light-combining prism element located on an optical path of the first light source and the second light source to combine the first color light and the second color light; and
a light-adjusting diaphragm element having a filter and located on an optical path generated after the first color light and the second color light are combined by the light-combining prism element or interposed between the second light source and the light-combining prism element, wherein a part of the energy of the second color light is blocked by the filter, such that a transmittance of the spectrum of the second wavelength range is less than a set value.

12. The projection system according to claim 11, wherein the center of the light-adjusting diaphragm element has an opening, and the filter is located on an outer edge of the opening.

13. The projection system according to claim 12, wherein the filter is hollowed to form the opening or the opening is formed of a transparent material.

14. The projection system according to claim 11, wherein the filter is located at the center of the light-adjusting diaphragm element, and the light-adjusting diaphragm element has an opening located on an outer edge of the filter.

15. The projection system according to claim 14, wherein the filter is hollowed to form the opening or the opening is formed of a transparent material.

16. The projection system according to claim 11, wherein the light-adjusting diaphragm element is formed of an entire filter element, and a peripheral area of the filter is shielded to form a light-shielding region.

17. The projection system according to claim 11, wherein the transmittance of the spectrum of the second wavelength range diminishes outwards from a center of the filter.

18. The projection system according to claim 17, wherein the filter is formed of light filtering materials having distinct transmittances with respect to the second color light.

19. The projection system according to claim 11, further comprising a digital micro-mirror device located on an optical path generated after the first color light and the second color light are combined.

20. The projection system according to claim 19, further comprising at least a condenser and a reflector, the reflector is interposed between the condenser and the digital micro-mirror device to reflect the first color light and the second color light to a plurality of micro-reflectors of the digital micro-mirror device.

* * * * *